(12) United States Patent
Jeong et al.

(10) Patent No.: US 12,549,861 B2
(45) Date of Patent: Feb. 10, 2026

(54) PART SURFACE INSPECTION AND ILLUMINATION SYSTEM

(71) Applicants: General Electric Company, Schenectady, NY (US); Oliver Crispin Robotics Limited, Altrincham (GB)

(72) Inventors: Younkoo Jeong, Clifton Park, NY (US); Ambarish J. Kulkarni, Glenville, NY (US); Vamshi Krishna Reddy Kommareddy, Bangalore (IN); Jonathan R. Hootman, West Chester, OH (US); Jean-Philippe Choinière, Orford (CA); Marc-André Blouin, Ste-Catherine (CA); Andrew Crispin Graham, Badminton (GB); Byron Andrew Pritchard, Loveland, OH (US)

(73) Assignees: General Electric Company, Evendale, OH (US); Oliver Crispin Robotics Limited, Altrincham (GB)

( * ) Notice: Subject to any disclaimer, the term of this patent is extended or adjusted under 35 U.S.C. 154(b) by 211 days.

(21) Appl. No.: 18/228,217

(22) Filed: Jul. 31, 2023

(65) Prior Publication Data
US 2024/0388806 A1 Nov. 21, 2024

(30) Foreign Application Priority Data
May 15, 2023 (IN) .............................. 202311033934

(51) Int. Cl.
*H04N 23/74* (2023.01)
*H04N 23/56* (2023.01)
*H04N 23/71* (2023.01)
*H04N 23/90* (2023.01)

(52) U.S. Cl.
CPC ............. *H04N 23/74* (2023.01); *H04N 23/56* (2023.01); *H04N 23/71* (2023.01); *H04N 23/90* (2023.01)

(58) Field of Classification Search
CPC . G01N 2021/8816; H04N 23/71; H04N 23/74
See application file for complete search history.

(56) References Cited

U.S. PATENT DOCUMENTS

| | | | |
|---|---|---|---|
| 10,408,766 B2 | 9/2019 | Okada | |
| 10,869,020 B2 | 12/2020 | Schmidt | |
| 2007/0097686 A1* | 5/2007 | Dunn | G01N 21/952 362/249.16 |
| 2020/0340929 A1* | 10/2020 | Chehaiber | G01N 21/89 |

(Continued)

FOREIGN PATENT DOCUMENTS

| | | |
|---|---|---|
| CN | 110596128 | 12/2019 |
| CN | 111649697 | 9/2020 |
| DE | 102005021783 | 11/2006 |

(Continued)

*Primary Examiner* — Jayanti K Patel
*Assistant Examiner* — Christopher Kingsbury Glover
(74) *Attorney, Agent, or Firm* — Fitch, Even, Tabin & Flannery LLP

(57) ABSTRACT

An inspection system is provided. The inspection system includes a light source and a surface profile compensator. The light source illuminates a contoured surface of a part. The surface profile compensator causes light emitted from the light source to be distributed over an inspection area of the contoured surface according to a target light distribution.

16 Claims, 8 Drawing Sheets

(56) References Cited

U.S. PATENT DOCUMENTS

2023/0062347 A1\* 3/2023 Nguyen ............. G01N 21/8851

FOREIGN PATENT DOCUMENTS

| | | | |
|---|---|---|---|
| DE | 102022208804 | | 3/2023 |
| EP | 3693927 | | 8/2020 |
| JP | 3236132 | B2 | 12/2001 |
| JP | 2016109462 | | 6/2016 |
| JP | 2016109462 | A \* | 6/2016 |
| JP | 3236132 | U | 2/2022 |

\* cited by examiner

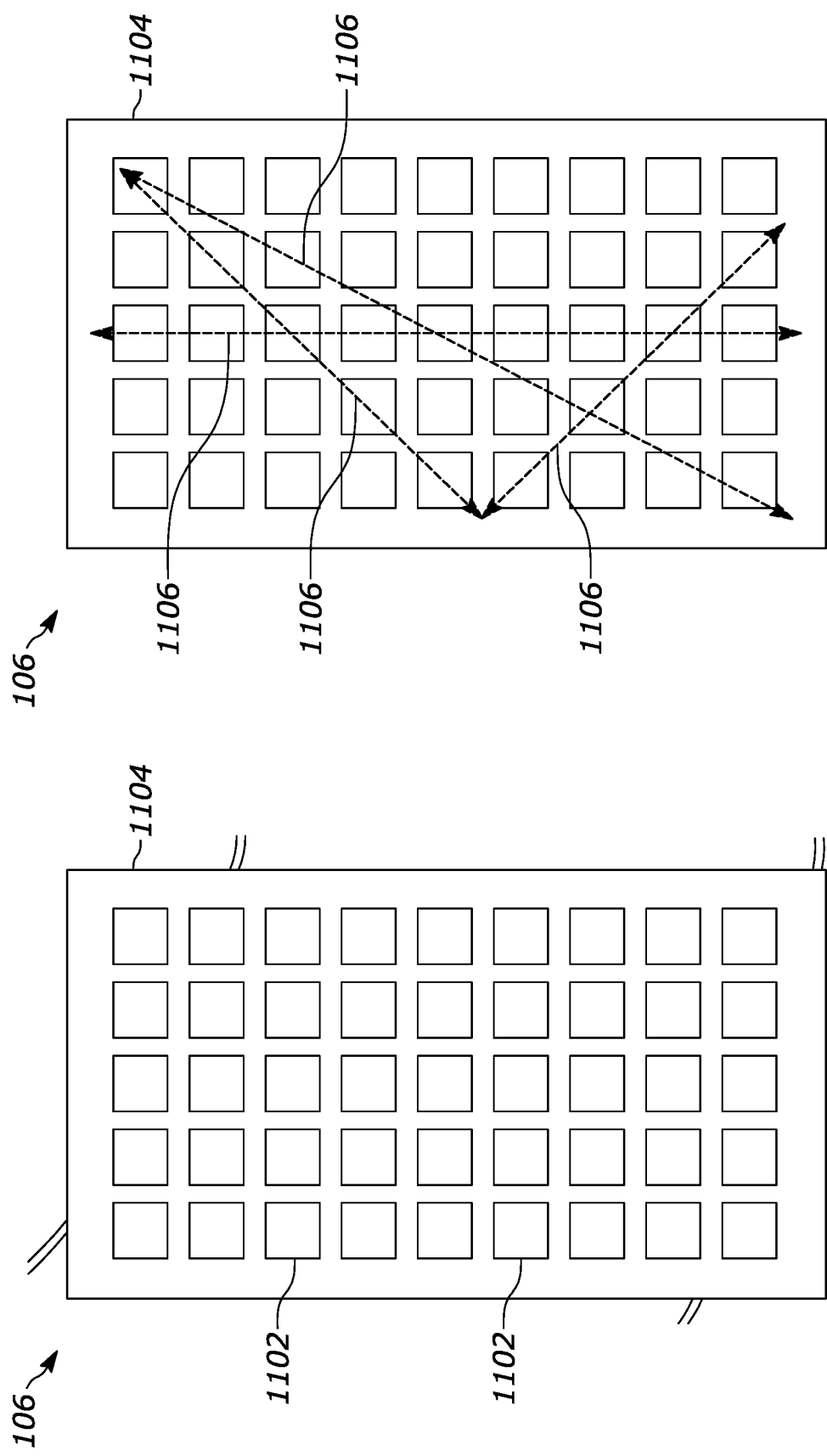

PART SURFACE INSPECTION AND ILLUMINATION SYSTEM

CROSS-REFERENCE TO RELATED APPLICATION(S)

This application claims priority to Indian Provisional Application No. 202311033934 filed May 15, 2023, which is incorporated herein by reference.

TECHNICAL FIELD

These teachings relate generally to jet engine inspection tools and more particularly to inspection and illumination systems for jet engine parts and the like.

BACKGROUND

Parts for jet engines or similarly complex systems generally require routine inspections. A jet engine inspection system can include a camera with a light source. The light source illuminates the surface of the part being inspected to enable the camera to better capture defects or other anomalies present on the part surface.

BRIEF DESCRIPTION OF DRAWINGS

Various needs are at least partially met through provision of the part surface inspection and illumination system described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which:

FIGS. 11-13 show schematic diagrams of a light source as configured in accordance with various embodiments of these teachings.

Figure 1:
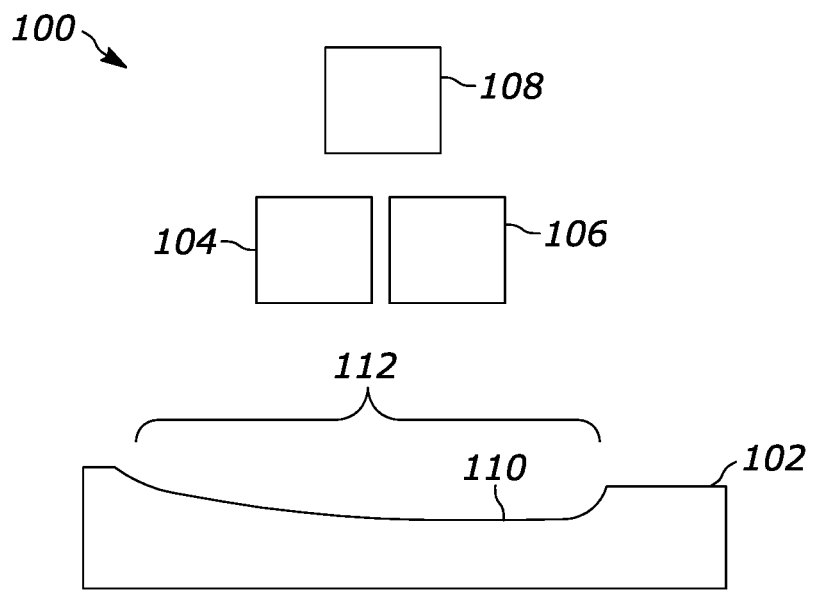
FIG. 1 is a block diagram of an inspection and illumination system as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Existing inspection and illumination systems generally employ a light source that is disposed normal to the surface of the part being inspected and near the camera capturing the images. This orientation of the light source can create issues when the part being inspected has a contoured profile. In particular, when acquiring images of these 3D surfaces using a light source disposed at a normal orientation near the camera, shallow geometric defects may not be captured in the images. Further, some existing imaging systems employ a bar-style light source that can cause a high level of divergent contrast in the images as a function of an illumination density variation on a 3D surface due to a distance change from the illumination bar to the 3D surface. In short, these systems have difficulty identifying shallow geometric defects present on the parts because of the lack of clear contrast (e.g., a lack of clear shadows and/or a negligible illumination variation with distance).

These defects can be more pronounced when a line scan camera is utilized. Generally, line scan cameras function well when illumination on the surface of the part being inspected is in the shape of a line. To provide linear illumination, a bar shape illumination source(s) can be installed near the surface or away from the surface. However, the distance variation between the illumination source and the surface can cause unacceptably high variation in the image contrast along the area of the part imaged by the image sensor. Specifically, the area of the surface closer to the light source appears brighter than the area of the surface that is further from the light source. Such variation is not desirable for inspection purposes because it generates dark and/or saturated (white) portions that degrade sections of the images and limit inspection of those areas. These are all significant challenges in the context of aviation application settings.

Generally speaking, the various aspects of the present disclosure can be employed with an inspection system that includes a camera that captures images of a contoured surface of a part being inspected, a light source that illuminates the contoured surface while the camera captures the images, and a surface profile compensator for the light source. The surface profile compensator causes light emitted from the light source to be distributed over an inspection area of the contoured surface in accordance with a target light distribution, which provides for improved image contrast on geometric defects in images acquired of the 3D contoured surface by the camera. In some embodiments, the inspection systems described herein can be applied to life limited parts, automatic white light setups, other white light setups, and other light wavelength applications for improved defect detection and/or repair efforts. In some embodiments, this versatility makes the systems highly scalable over broad applications both inside and outside of aviation-related applications.

In some embodiments, the surface profile compensator can provide the target light distribution by 1) by passively or actively shaping a support structure of the light source to have a 2D profile shape that matches that of the 3D contoured surface; and/or 2) altering illumination densities of various lighting elements of the light source. Furthermore, the surface profile compensator can alter the direction of illumination of the light source and/or alter illumination direction with a varied spectrum of light output from the light source in order to highlight the geometric defects. These techniques can provide for improved image contrast on geometric defects of the 3D contoured surface and limit the dependency between the 3D surface profile and image quality for images acquired by a camera of the 3D contoured surface. In short, these techniques allow for the image acquisition on a 3D surface with better and/or more differentiated contrast with respect to geometrical defects that exist on the 3D surface.

The foregoing and other benefits may become clearer upon making a thorough review and study of the following detailed description. Referring now to the drawings, and in particular to FIG. 1, an inspection system 100 that is compatible with many of these teachings and is used for inspecting a part 102 will now be presented. The inspection system 100 includes a camera 104, a light source 106, and a surface profile compensator 108. As seen in FIG. 1, the part 102 includes a 3D or contoured (e.g., not flat) profile surface 110 along at least part of an inspection area 112 of the part 102. Examples of the part 102 include but are not limited to Compressor Discharge Pressure (CDP) or Interstage seals used for aircraft engines. In operation, the camera 104 captures images of the contoured surface 110 while the light source 106 illuminates the contoured surface 110. Furthermore, surface profile compensator 108 causes light emitted from the light source 106 to be distributed over the inspection area 112 according to a target light distribution. Specifically, in some embodiments, the target light distribution can include a uniform light density that the surface profile compensator 108 provides for at each pixel in an image sensor of the camera 104. This uniform distribution can be defined as an equivalent amount of illuminance (e.g., lux or lumens per square millimeter) being emitted onto subdivided regions of the inspection area 112 and or an equivalent amount of illuminance being received at the camera 104 for each pixel or other subdivided regions of the image sensor. Such equivalence can have a tolerance of 5% from a target illuminance.

The target light distribution can also include other non-uniform distributions of light based on the specifics of the part 102 being inspected. For example, where the part 102 has multiple different surface characteristics such as color, reflectivity, surface finish, etc., the target light distribution can be set to account for these different conditions. For example, a part that has coatings on a portion of its surface such as a tip region can have a target light distribution where the luminance of the tip region is different from the other sections of the part 102. Furthermore, for parts that include top lit holes or thin features that are deep, the target light distribution can be setup to create a pattern where a greater amount of light is distributed at locations corresponding to the holes even where doing so may over expose other areas visible to the camera 104. Additionally, where the part 102 that has been shot peened on a specific area during repairs, the target light distribution can include a lower light intensity at that area to detect only the highlights caused by the cracking. Where the part 102 has been machined on a pressure face, the target light distribution can be set to provide a high angle relative to the inspection area 112 to avoid tool marks from showing. Where the part 102 includes a multi-material assembly of metal and honeycomb (e.g., rectifiers), the target light distribution can provide for a higher intensity of light in the honeycomb regions compared to the metal regions because the defect types there are different.

In some embodiments, the target light distribution can reflect different angles of incidence for the light in the part 102 and/or varying focus points for the camera 104. For example, where the part 102 has various height levels, the target light distribution can be set to make dark or black areas where focus is not required.

Figure 2:
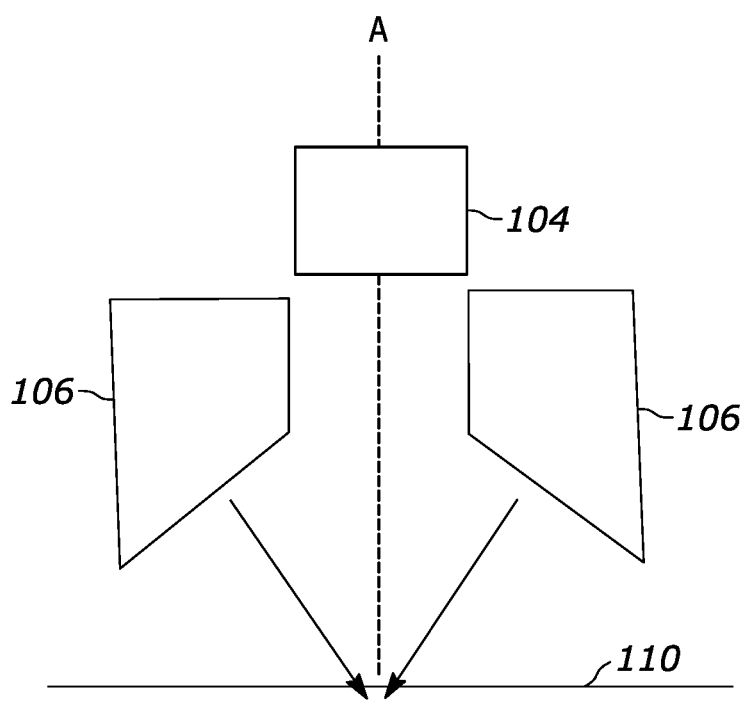
FIG. 2 is a schematic cross-sectional view of an inspection and illumination system as configured in accordance with various embodiments of these teachings.

In some embodiments, the camera 104 can include a line-scan camera that is disposed above the contoured surface 110, for example, as shown in FIG. 2. In these embodiments, the light source 106 can include two light source elements that are disposed on opposite sides of an imaging axis A of the line scan embodiment of the camera 104. Furthermore, as seen in FIG. 2, the two light source elements can be angled so as to emit light directionally towards the imaging axis A. In some embodiments, the angle of the two light source elements can be approximately 45 degrees. Furthermore, in some embodiments, activations of the two light source elements can be alternated to provide different light contrast characteristics on the inspection area 112. The number of the light source elements can be more than two with various directional angles and can be alternated sequentially or with sub groups in order to highlight geometrical defects.

Figure 3:
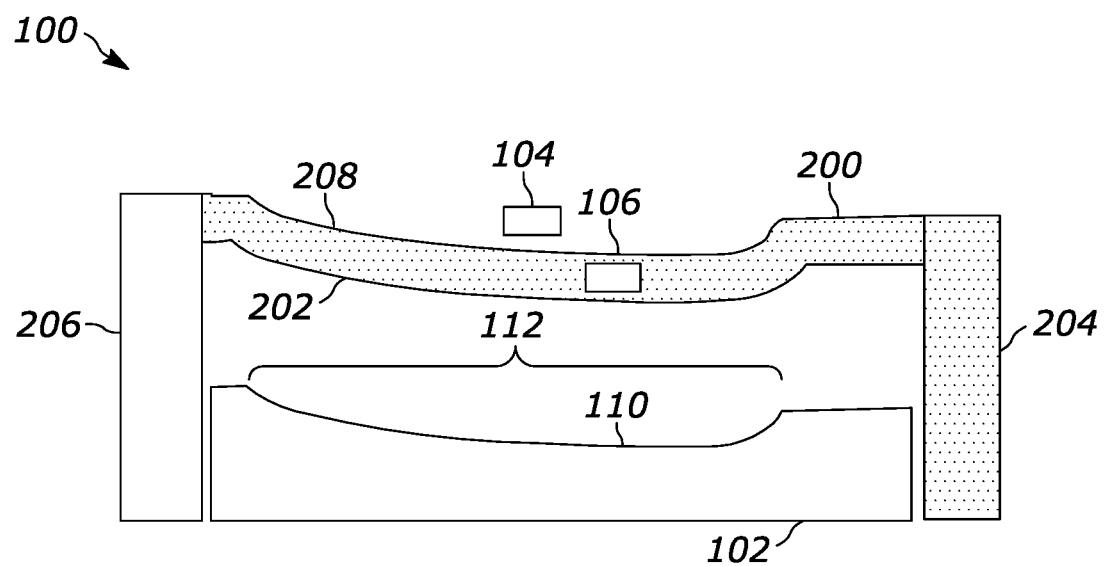
FIG. 3 is a schematic cross-sectional view of an inspection and illumination system as configured in accordance with various embodiments of these teachings.

With reference now to FIG. 3, an embodiment of the inspection system 100 is presented. As seen in FIG. 3, the inspection system 100 can include a support structure 200 to which the light source 106 is coupled. In some embodiments, the support structure 200 is configured to position the light source 106 such that the illumination area of the light source and a field of view of the camera 104 overlap on a portion of the inspected part 102. The camera 104 can be coupled to the support structure 200 or positioned separately therefrom. When the camera is not coupled to the support structure 200, the support structure 200 can be configured to provide a view path through the support structure 200 such that the field of view of the camera 104 can image the inspection area 112.

In some embodiments, the support structure 200 is configured to position the camera 104 and/or the light source 106 above the inspected part while the part 102 spins about a central axis such that the inspection area 112 rotates past the illumination area of the light source 106 and the field of the view of the camera 104. In these embodiments, the support structure 200 acts as the surface profile compensator 108 by having an illumination surface 202 disposed above the inspection area 112 and that complements and follows the contoured surface 110 so as to distribute the light emitted by the light source 106 over the inspection area 112 according to the target light distribution. In some embodiments, the camera 104 and light source 106 are configured to move in a rotational fashion around a stationary inspection area. In other embodiments, the camera 104 and light source 106 may be configured to move in other curved and linear motions relative to an inspection area 112 which may not be axisymmetric. It will also be understood by a skilled person that all motions described in any embodiment herein is relative motion of the inspection system and inspected object and that motion of the inspection area 112 and motion of the camera 104 and light source 106 are functionally interchangeable without affecting the usefulness of the embodiments described.

Figure 4:
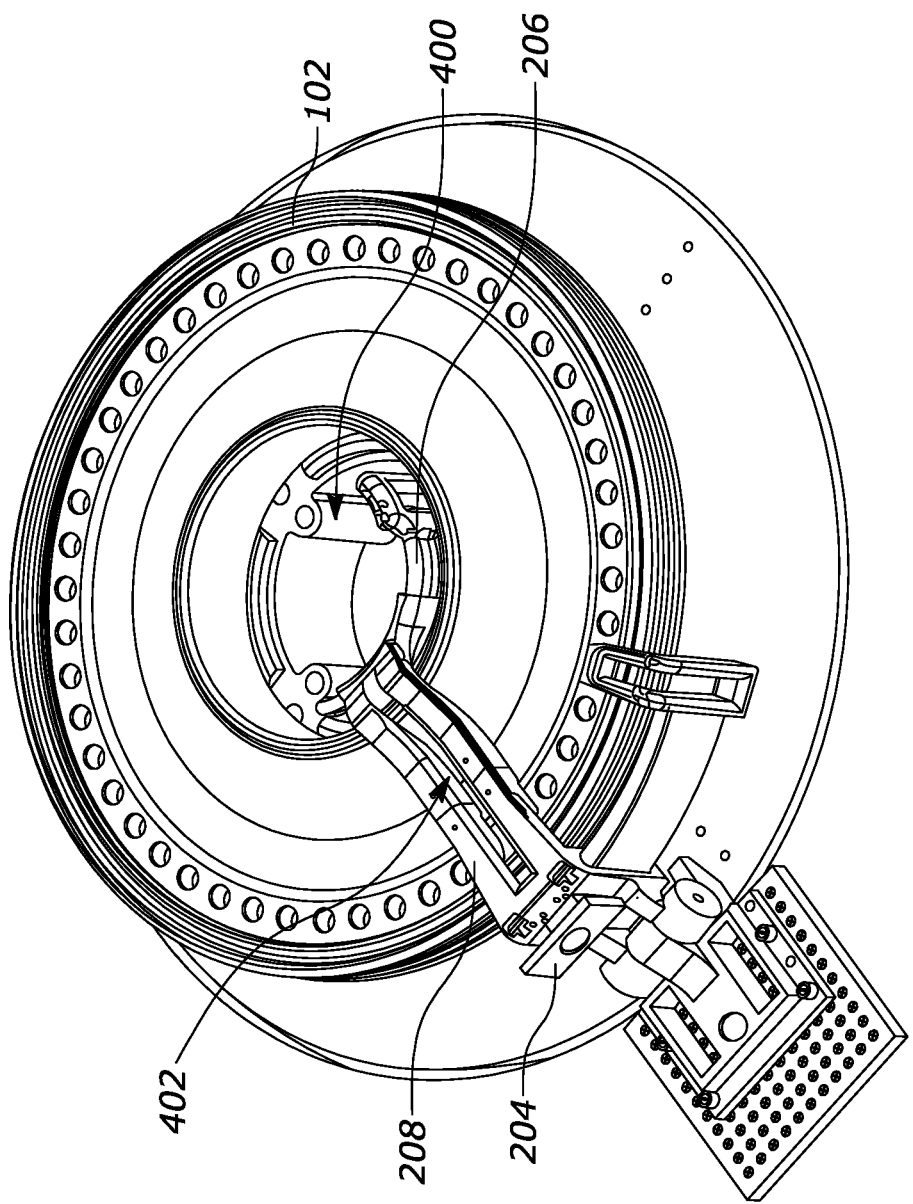
FIG. 4 is a perspective view of an inspection and illumination system as configured in accordance with various embodiments.

Furthermore, as seen in FIGS. 3 and 4, in some embodiments, the support structure 200 can include a first support 204, a second support 206, and a bridge 208. The bridge 208 can include the light source 106 and optical path slot 402, and can be pivotably coupled to the first support 204 to enable the bridge 208 to span across at least a portion of the part 102 in a first down position and to be clear of the part 102 in a second up position for loading/unloading of the part 102. The optical path slot 402 can provide an unobstructed path for the camera 104 to view the inspection area 112 through the support structure support structure 200. The bridge 208, which includes the light source 106, can be configured to be adjustable in its location along the circumferential direction for better alignment of the optical path to the camera. The second support 206 can be configured to physically support the bridge 208 across the part 102 when the bridge 208 is in the first position.

As such, the second support 206 can be physically coupled to an end of the bridge 208 opposite of the first support 204 such that the second support 206 rests within a central region 400 of the part 102. However, in some embodiments, the second support 206 can be permanently fixed within the central region 400 such that the bridge 208 removably couples to the second support 206 when moved from the first to the second position. As seen in FIG. 3, the bridge 208 is structured so that the illumination surface 202 is curved or contoured to match a cross-sectional profile of the contoured surface 110. This physical matching of the profile of the contoured surface 110 reduces variation in the lighting in the inspection area 112 along a direction of the image sensor of the camera 104 when compared with prior known systems. As such, the direction of illumination becomes a more dominant factor over variation in surface geometry. These benefits can be most pronounced for parts that are axially symmetric. It will be appreciated that other variations of the support structure 200 are also possible, such as a housing coupled to an end-effector, a similar robotic arm, or the like.

In some embodiments, the support structure 200 and the illumination surface 202 can be physically formed to permanently complement the contoured surface 110 to form a part-specific profile-matched illumination system. Utilizing a permanently deformed support structure 200 is beneficial where the inspection system 100 is being utilized in conjunction with a single part or part type for which the contoured surface 110 will have a preconfigured and persistent 3D profile.

However, in embodiments where the inspection system 100 will be utilized in conjunction with parts for which the contoured surface 110 will vary, the support structure 200 may be configured to physically deform based on the contours of the contoured surface 110. The deformation of the support structure 200 may be passive or active. In passive deformation embodiments, the illumination surface 202 or a portion thereof that contains the illumination surface 202 is formed from a pliable material that conforms to the shape of the contoured surface 110 when the support structure 200 is contacted with the contoured surface 110. The passively deformable variant of the support structure 200 can take various forms. Such forms include a castable gel, rubber, or similar material, and/or a system of multiple sliding elements that are retainable at different depths to allow for variation in the illumination surface 202. In passive deformation embodiments, the system may lower the support structure 200 to press the illumination surface 202 against the contoured surface 110 to shape the illumination surface 202, lift the support structure 200, and capture images while the illumination surface 202 retains the shape formed by contacting the contoured surface 110.

Figure 5:
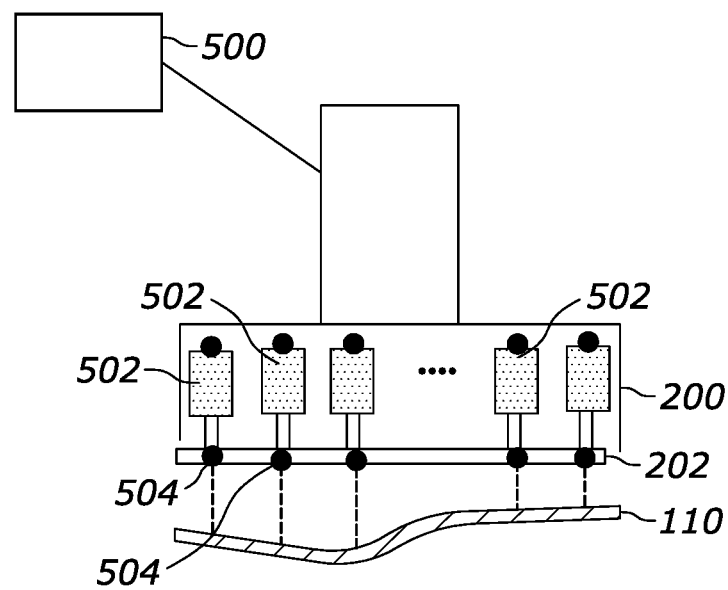
FIG. 5 is a schematic diagram of a support structure of an inspection and illumination system as configured in accordance with various embodiments of these teachings.
Figure 6:
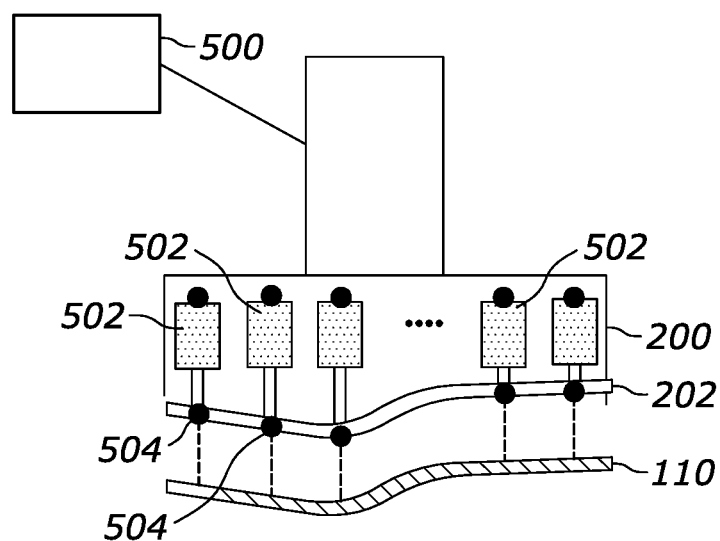
FIG. 6 is a schematic diagram of a support structure of an inspection and illumination system as configured in accordance with various embodiments of these teachings.

In active deformation embodiments, with reference to FIGS. 5 and 6, the inspection system 100 can include a controller 500 and one or more actuators 502 that deform the illumination surface 202 at the direction of the controller 500, for example, by extending or retracting in length. The controller 500 can include a programmable processor, a microprocessor, a field programmable gate array, or the like. In some embodiments, the inspection system 100 can include one or more distance sensors 504 that are associated with each of the one or more actuators 502 as seen in FIGS. 5 and 6. In such embodiments, each of the one or more distance sensors 504 measures a respective current distance to the contoured surface 110, and the controller 500 directs each of the one or more actuators to deform the support structure 200 and/or the illumination surface 202 such that the respective current distance as measured by each of the one or more distance sensors 504 are within a predetermined range of each other. For example, as seen in comparing FIG. 5 with FIG. 6, the initially flat illumination surface 202 shown in FIG. 5 is deformed by the one or more actuators 502 into a 2D profile that matches the 2D profile of the contoured surface 110 as shown in FIG. 6.

It will be appreciated that other methods of active deformation may be used. For example, active vacuum based formation systems or other similar systems known in the art may be used. It will also be appreciated that other sensors for determining the shape of the contoured surface 110 may be used. Such additional sensors could include pressure sensors or other similar devices known in the art.

In some embodiments, the one or more distance sensors 504 can be omitted. In these embodiments, the controller 500 can direct the modification of the one or more actuators 502 and in turn the modification of the illumination surface 202 based on a received user input or another input used for determining a specific state for each of the one or more actuators 502. In some embodiments, the user input can identify the contoured shape of the contoured surface 110, such as by choosing a specific 2D profile, a 3D model, or designation of the part 102 that is saved in a memory electrically connected to the controller 500. In these embodiments, the specific 2D profile, the 3D model, or designation of the part 102 can be cross-referenced in the memory with specific states (e.g., extension length) for each of the one or more actuators 502 that would cause the illumination surface 202 to match the contoured surface 110 for that specifically selected 2D profile, model, or part. In some embodiments, the received user input may instead include the designated states (e.g., length) for each of the one or more actuators 502 directly.

In some embodiments, the controller 500 determines specific states for each of the one or more actuators 502 based on the identification of regions of the inspection area 112 where the light from the light source 106 is distributed contrary to the target light distribution. In such embodiments, the inspection system 100 includes a processor, such as a processor of the controller 500 or another computing device electrically coupled to the camera 104 that receives the images from the camera 104. This processor may parse the images to identify the regions of the inspection area 112 where the light is distributed contrary to the target light distribution. Then, the processor and/or the controller 500 can direct ones of the one or more actuators associated with the regions to deform the illumination surface 202 in a manner that will correct the distribution of light in the identified regions (e.g., by altering the specific extension length of those actuators). For example, the processor may identify one or more low-light regions in the captured image and cause the actuator corresponding to the low-light regions to extend towards the inspected surface 110 to reduce the distance between the illumination surface 202 and the inspected surface 110.

Figure 7:
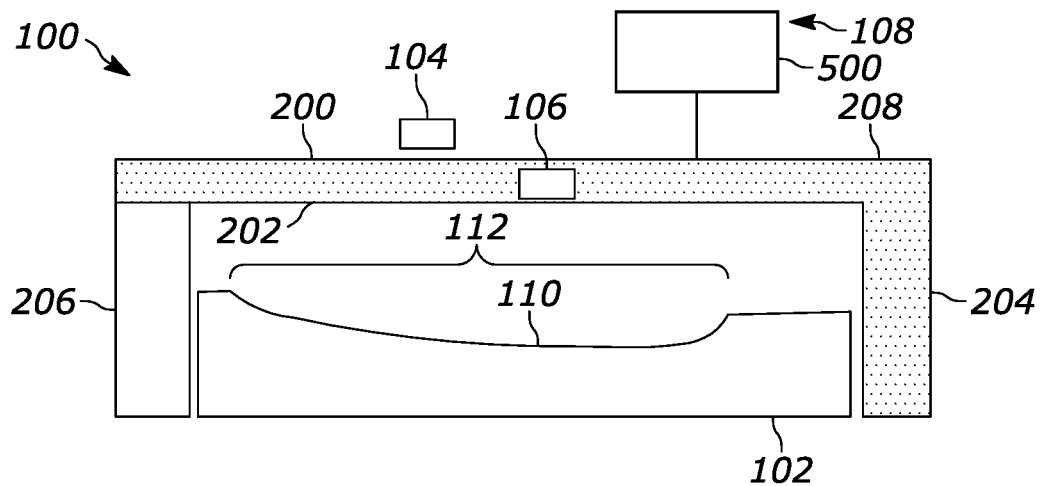
FIG. 7 is a schematic cross-sectional view of an inspection and illumination system as configured in accordance with various embodiments of these teachings.

With reference now to FIG. 7, another embodiment of the inspection system 100 is presented. As seen in FIG. 7, the inspection system 100 can include the controller 500, which is electrically coupled to the light source 106 to act as the surface profile compensator 108 by adjusting the intensity of the light source 106 at different locations (e.g., by utilizing changes in illumination to provide active density variation) to distribute light over the inspection area 112 according to the target light distribution. As seen in FIG. 7, in these embodiments, the support structure 200 and the illumination surface 202 can be flat and/or otherwise not contoured to complement the contoured surface 110 in contrast to the embodiments shown and described in connection with FIGS. 3-6. However, it will be appreciated that in some embodiments, adjustment of the light intensity using the controller 500 can be paired with the perpetually deformed, passively deformable, and/or actively deformable variants of the support structure 200 to further refine the distribution of the light emitted from the light source 106.

Figure 8:
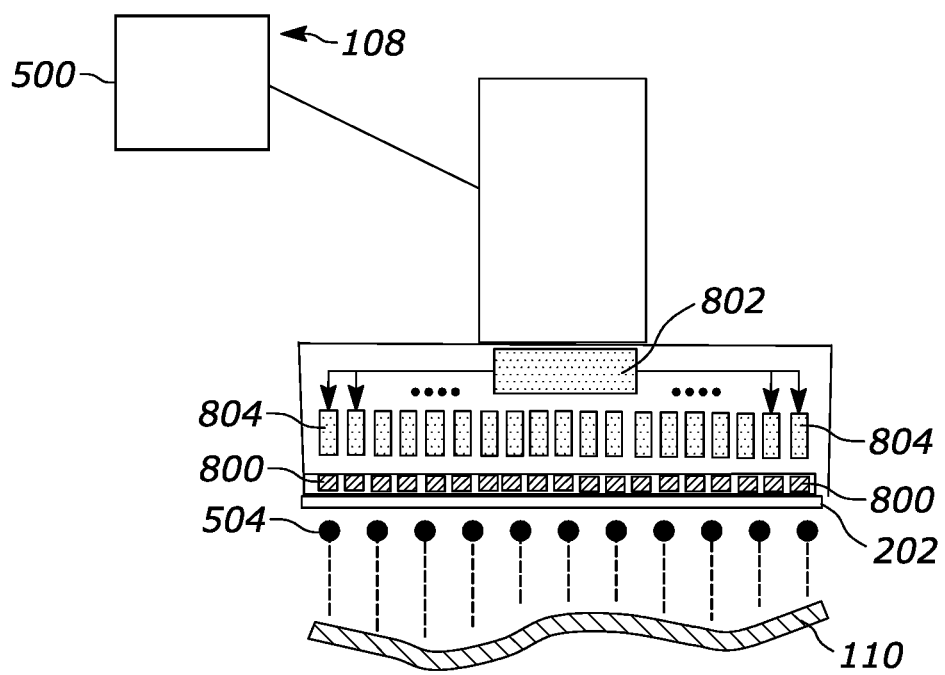
FIG. 8 is a schematic diagram of a support structure of an inspection and illumination system as configured in accordance with various embodiments of these teachings.

With reference now to FIG. 8, the light source 106 can be made up of a plurality of different individually controllable lighting elements 800, such as light emitting diodes or similar elements known in the art. Each of the different individually controllable lighting elements 800 can be individually controlled by the controller 500 interacting with a driver device 802 to cause each of the different individually controllable lighting elements 800 to emit different intensities of light. In some embodiments, the driver device 802 is a multi-channel driver that directly controls the light output of each of the different individually controllable lighting elements 800. However, in some embodiments, the driver device 802 can interact with variable resistance elements 804 for each of the different individually controllable lighting elements 800 to control the light output.

Furthermore, as seen in FIG. 8, embodiments of the inspection system 100 that utilize lighting control as the surface profile compensator 108 can include the one or more distance sensors 504. In these embodiments, the controller 500 can adjust the intensity of the different individually controllable lighting elements 800 modifying the respective light output from the different lighting elements based on the respective current distance as measured by each of the one or more distance sensors 504. Generally, the controller 500 is configured to cause a lighting element to output greater light intensity when a corresponding distance sensor measures a greater distance to the contoured surface 110.

Furthermore, as with the active deformation embodiments described above, the one or more distance sensors 504 may be omitted and the controller 500 may direct the modification of the different individually controllable lighting elements 800 based on a received user input or another input. As above, the user input can identify the contoured shape of the contoured surface 110, such as by choosing a specific 2D profile, a 3D model, or designation of the part 102 that is saved in a memory electrically connected to the controller 500. In these embodiments, the specific 2D profile, the 3D model, or designation of the part 102 can be cross-referenced in the memory with specific states (e.g., light output amounts) for each of the different individually controllable lighting elements 800 that would cause even light distribution on the contoured surface 110 for that specifically selected 2D profile, model, or part. In some embodiments, the received user input can include the designated states for each of the different individually controllable lighting elements 800 directly.

Furthermore, the controller 500 can also utilize the identification of the regions of the inspection area 112 where the light from the light source 106 is distributed contrary to the target light distribution for a current state of each of the different individually controllable lighting elements 800 as an alternate input. As above, in such an embodiment, the inspection system 100 can include a processor, such as a processor of the controller 500 or another computing device electrically coupled to the camera 104 that receives the images from the camera 104. This processor can parse the images to identify the regions of the inspection area where the light is distributed contrary to the target light distribution. Then the processor and/or the controller 500 can alter the illumination outputs of one of the different individually controllable lighting elements 800 associated with the regions to correct the light distribution in the identified regions. In some embodiments, this process may be aided by the use of a model or ideal target representative of the to be inspected contoured surface 110 made of or finished with a uniformly colored material of uniform reflectance, or an ideal example of the contoured surface 110 known to be free of defects, such that the alteration of illumination is known to be done using an ideal target contoured surface 110 or model of the same.

It will be appreciated that various embodiments for the different individually controllable lighting elements 800 are possible. Such embodiments include both visible and non-visible spectrum light-emitting diodes, laser light sources, incandescent lights, fluorescent lights, etc. In the case of a single source laser (or collimated beam), the control of the light emitted on the surface can be accomplished by actively adjusting the laser/beam power based on the distance to the surface with an active power control module & raster scanner with much higher bandwidth than the frame rate of the camera 104.

Furthermore, in some embodiments, the illumination direction of the inspection area 112 (see FIG. 7) can be varied by utilizing lighting elements that are positioned to emit differing spectrums of light onto different locations of the inspection area 112 (see FIG. 7). These differing spectrum light sources can be utilized in conjunction with an image sensor of the camera 104 that is configured to filter out the different spectrums such that different features of the part 102 can be discerned from a single white light illumination and captured image. Or alternatively, the images with differing spectrum light sources can be acquired by a monochrome camera, and illuminated in a sequence. Systems along these lines are disclosed and described in U.S. application Ser. No. 17/985,501 filed Nov. 11, 2022, titled Inspection Systems and Methods Employing Different Wavelength Directional Light For Enhanced Imaging, the entirety of which is incorporated by reference herein.

Figure 9:
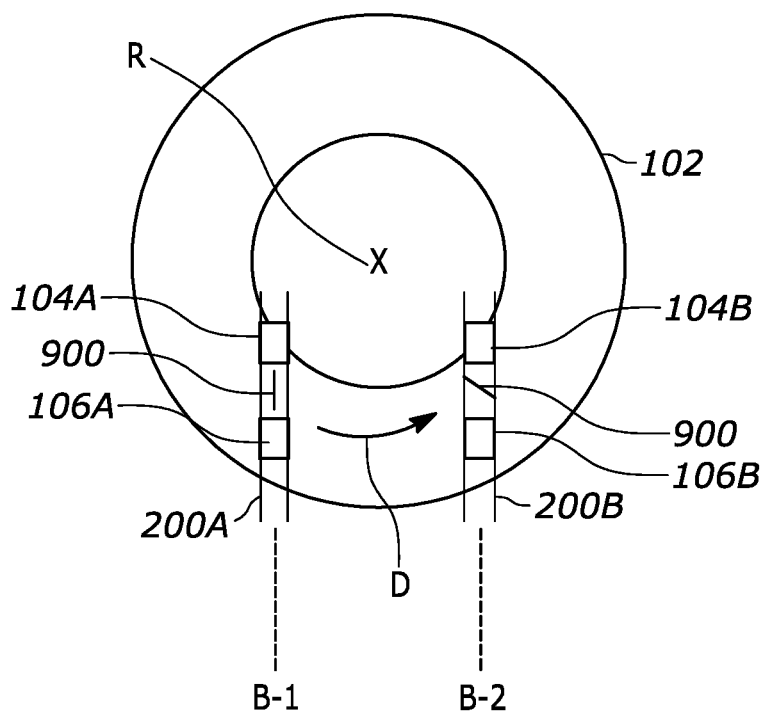
FIG. 9 is a schematic top view of an inspection and illumination system as configured in accordance with various embodiments of these teachings.

With reference now to FIG. 9, another embodiment of the inspection system 100 is shown. In this embodiment, the inspection system 100 includes at least two support structures 200A and 200B that both include cameras and light sources and positions those cameras and light sources transverse to the part 102. As seen in FIG. 9, the support structure 200A positions the camera 104A and the light source 106A on an axis B-1 that does not intersect with a rotational axis R around which the part 102 rotates. Furthermore, the support structure 200B positions the camera 104B and the light source 106B on an axis B-2 that is parallel with the axis B-1 and thus also does not intersect with the rotational axis R. In some embodiments, the axis B-2 can be positioned with a different offset from rotational axis R and a different angle from axis B-1 such that the direction of the light source 106B to a defect 900 is different from the direction of light source 106A to the defect 900 at corresponding image acquisition moments by the camera 104B and the camera 104A, respectively.

In general, a defect that is primarily aligned perpendicular to the axis on which a camera and light source are deployed will display weak contrast in an image. As such, if the deployment axis for the support structures 200A and 200B were both aligned to the rotational axis R of the part 102, the orientation of a defect 900 traveling in the direction D would appear the same to the cameras 104A and 104B and no change in contrast would be noted between the images from the cameras 104A and 104B. However, by positioning the support structures 200A and 200B to not intersect with the rotational axis R, the orientation of the defect 900 with respect to the camera 104A and light source 106A is different from the orientation with respect to the camera 104B and light source 106B as seen in FIG. 9. This change in orientation enables differing contrast to be deployed against the same defect 900 on the part 102 such that the chance of detecting that defect in the images from one of the cameras 104A or 104B is increased.

It will be appreciated that the two support structures 200A and 200B can encompass any of the embodiments described herein including the various embodiments of the surface profile compensator 108 (See FIG. 1). Furthermore, the dual arrangement of the support structures 200A and 200B can also be utilized without a surface profile compensator 108 and instead rely primarily on the defect orientation difference described above to improve contrast. In addition, it will be appreciated that while the axes B-1 and B-2 shown in FIG. 9 are straight lines, the shape of the lines B-1 and B-2 may be selected from a range of other curves to obtain specific illumination characteristics. For example, by defining B-1 as an involute curve of a circle, the angle between the light source 106A and a local motion vector of the defect 900 would be a constant, over the length of the light source 106A. Furthermore, where B-2 is defined as a mirror image curve of B-1, respective local angles between the light source 106A and the defect 900 and between the light source 106B and the same defect 900 will always to be equal and opposite, at whatever radius the defect 900 lies on the surface of part 102. In place of a line scan camera, a non-linear part of an image from a 2-D area camera (i.e., a camera capable of imaging an area) may be selected and stitched together to form a complete image of the part 102.

Figure 10:
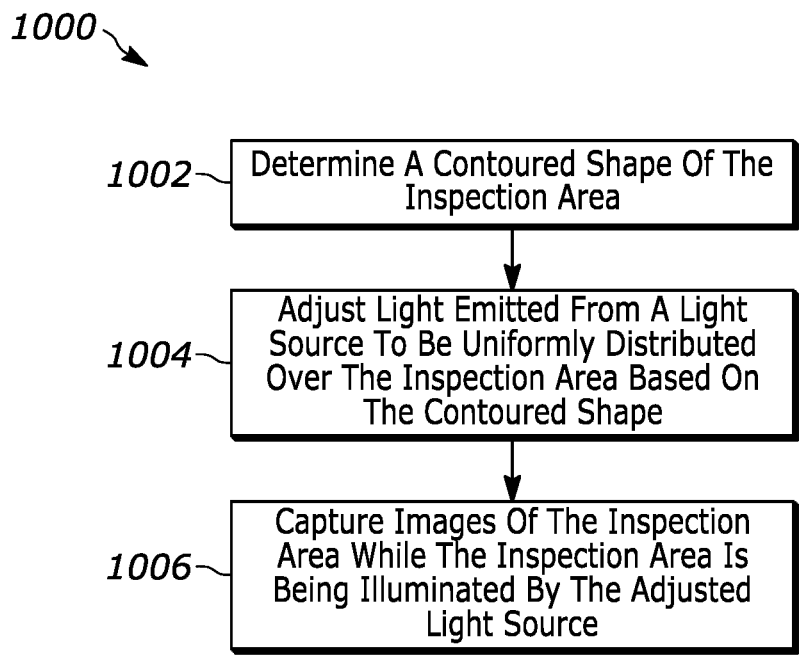
FIG. 10 is a flow diagram of a method in accordance with various embodiments of these teachings.

Turning now to FIG. 10, a flow chart of method 1000 for operating the inspection system 100 is shown. The method 1000 includes determining 1002 the contoured shape of the inspection area 112. In some embodiments, the contoured shape of the inspection area 112 is determined based on the received user input, an image of the part captured by the camera, readings from the one or more distance sensors 504, physically contacting illumination surface 202 with the contoured shape of the inspection area 112 to deform the support structure 200 accordingly, and/or any of the other processes described herein. It will be appreciated that a contoured shape of the part 102 can be determined in place of or in addition to determining the contoured shape of the inspection area 112. For example, in some embodiments, the contoured shape of the part 102 can be determined and then subsequently used to determine the contoured shape of a sub-region of the part 102 that corresponds to the inspection area 112.

After the contoured shape of the inspection area 112 is determined, the method 1000 includes adjusting 1004 light emitted from the light source 106 to be distributed over the inspection area 112 based on the contoured shape and according to a target light distribution. In some embodiments, the light emitted from the light source is adjusted by passively deforming the support structure 200, actively deforming the support structure 200, utilizing the permanently deformed support structure 200, altering the intensity and/or frequency of the light emitted by the light source 106, and/or any of the other processes described herein. Next, the method 1000 includes capturing 1006 images of the inspection area 112 while the inspection area 112 is being illuminated by the adjusted light source 106. In some embodiments, the images may be captured while the inspected part rotates about a rotational axis, such as a central axis of the inspected part. Adjustment of the light source 106 can be accomplished by any embodiment of the surface profile compensator 108 described herein. In some embodiments, after an image is captured, the system 100 may further adjust the light source 106 via the surface profile compensator 108 based on the captured image prior to the next image capture in a feedback loop.

Figure 13:
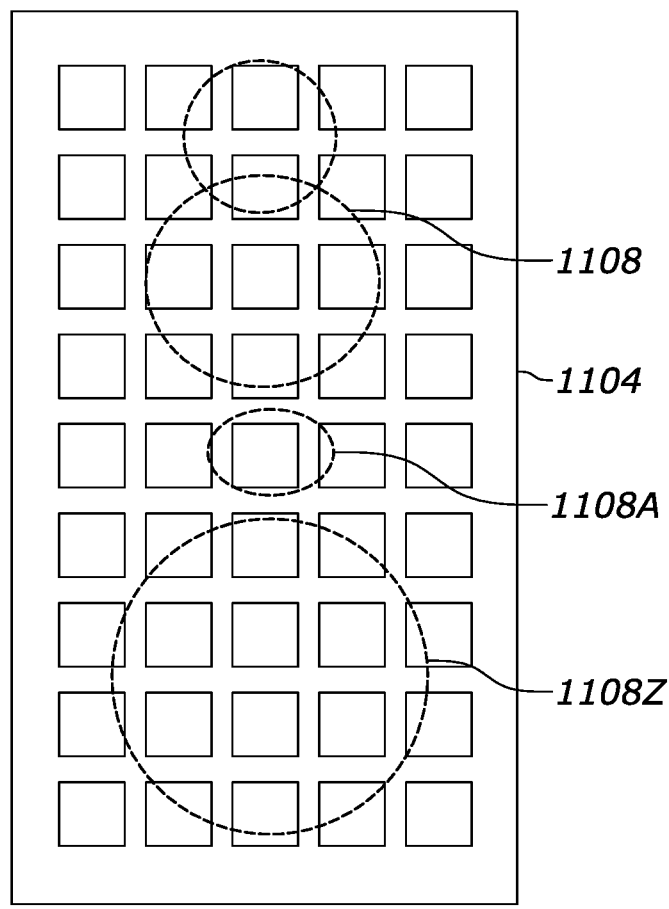

Turning now to FIGS. 11-13, an LED bank embodiment of the light source 106 for use in any of the systems and methods described herein is shown. As seen in FIG. 11, the LED bank variant of the light source 106 includes a plurality of LEDs 1102 embedded in a rectangular support structure 1104. The rectangular support structure 1104 is suspended over and in a plane that is generally parallel to the part 102. In operation, the controller 500 can operate the plurality of LEDs 1102 in a variety of different ways so as to achieve the target light distribution on the inspection area 112. For example, as seen in FIG. 12, the plurality of LEDs 1102 can be activated in one or more multi-directional groupings 1106 to account for configurations of the part 102 and likely locations of defects. Furthermore, as seen in FIG. 13, the plurality of LEDs 1102 can be activated in cone-angle projection groups 1108. The cone-angle projection groups 1108 can include circular or similar area grouping of the plurality of LEDs 1102. Small area cone-angle projection groups such as 1108A can correspond to lower points (e.g., further normal distances away from the rectangular support structure 1104) on the contour of the inspection area 112 and have a high light intensity output. Large area cone-angle projection groups such as 1108Z can correspond to higher points (e.g., shorter normal distances away from the rectangular support structure 1104) on the contour of the inspection area 112. Finally, in some embodiments, the controller 500 can activate each of the plurality of LEDs 1102 with a different phase delay so that different portions of the inspection area 112 are illuminated as the part 102 moves past the light source 106.

Further aspects of the disclosure are provided by the subject matter of the following clauses:

An inspection system comprising: at least one light source that illuminates a contoured surface of a part being inspected; and a surface profile compensator for the light source, wherein the surface profile compensator causes light emitted from the at least one light source to be distributed over an inspection area of the contoured surface according to a target light distribution.

The inspection system of any preceding clause wherein the surface profile compensator comprises a support structure to which the light source is coupled, wherein the support structure is physically configured to complement contours of the contoured surface to distribute the light over the inspection area according to the target light distribution.

The inspection system of any preceding clause wherein the support structure includes a first support, a second support, and a bridge, wherein the bridge includes the light source and an optical path slot for a camera to view the inspection area through the support structure, is pivotably coupled to the first support, and is removably coupled to the second support to span over the inspection area.

The inspection system of any preceding clause further comprising one or more actuators that actively deform the support structure to complement the contours of the contoured surface.

The inspection system of any preceding clause further comprising one or more distance sensors associated with each of the one or more actuators, wherein each of the one or more distance sensors measure a respective current distance to the contoured surface, and wherein a controller directs each of the one or more actuators to deform the support structure such that the respective current distance as measured by each of the one or more distance sensors are within a predetermined range of each other.

The inspection system of any preceding clause further comprising a controller that receives user input identifying a shape of the contoured surface and that, responsive to the user input, directs the one or more actuators to deform the support structure to complement the shape of the contoured surface based on the user input.

The inspection system of any preceding clause further comprising: a camera that captures images of the contoured surface; and a processor that receives the images, parses the images to identify regions of the inspection area where the light is distributed contrary to the target light distribution, and directs ones of the one or more actuators associated with the regions to deform the support structure to correct light distribution in the identified regions to conform to the target light distribution.

The inspection system of any preceding clause wherein the support structure is formed from a pliable material that conforms in part to a shape of the contoured surface when the support structure contacts the contoured surface.

The inspection system of any preceding clause further comprising a controller electrically coupled to the light source, wherein the controller acts as the surface profile compensator by adjusting an intensity of the light source at different locations to distribute the light over the inspection area according to the target light distribution.

The inspection system of any preceding clause further comprising one or more distance sensors associated with different lighting elements of the light source, wherein each of the one or more distance sensors measures a respective current distance to the contoured surface, and wherein the controller adjusts the intensity of the light source by modifying respective light output from the different lighting elements based on the respective current distance as measured by each of the one or more distance sensors.

The inspection system of any preceding clause wherein the controller receives user input identifying a shape of the contoured surface and that, responsive to the user input, adjusts the intensity of the light source at the different locations based on the user input.

The inspection system of any preceding clause further comprising a camera that captures images of the contoured surface, wherein the controller receives the images, parses the images to identify regions of the inspection area where the light is distributed contrary to the target light distribution, and adjusts the intensity of the light source at the different locations to correct light distribution in the identified regions to conform to the target light distribution.

An inspection system comprising: a first camera that captures first images of a surface of a part at a first location while the part rotates about a rotational axis; a first light source that illuminates the surface while the first camera captures the first images; and a first support structure that positions the first camera and the first light source transverse to the first location on a first axis that does not intersect with the rotational axis.

The inspection system of any preceding clause further comprising: a second camera that captures second images of the surface of the part at a second location while the part rotates about the rotational axis, the second location being different from the first location; a second light source that illuminates the surface while the second camera captures the second images; and a second support structure that positions the second camera and the second light source relative to the second location on a second axis that does not intersect with the rotational axis.

The inspection system of any preceding clause wherein the second axis is parallel to the first axis.

The inspection system of any preceding clause further comprising a surface profile compensator for the first light source, wherein the surface profile compensator causes light emitted from the first light source to be distributed over an inspection area of the surface of the part at the first location according to a target light distribution.

The inspection system of any preceding clause wherein the first light source includes two light emitting regions disposed on opposite sides of the first camera within the first support structure and positioned to emit light at respective angles relative to an attachment surface of the first support structure.

A method of illuminating an inspection area of a part being inspected, the method comprising: determining a contoured shape of the inspection area; and adjusting, via a surface profile compensator, light emitted from a light source to be distributed over the inspection area based on the contoured shape and a target light distribution.

The method of any preceding clause wherein the surface profile compensator includes a support structure for the light source that physically deforms to complement the contoured shape of the inspection area.

The method of any preceding clause wherein the surface profile compensator includes a controller that alters an amount of light output by different lighting elements of the light source at different locations to distribute the light over the inspection area based on the determination of the contoured shape.

The systems or methods of any preceding clauses wherein the target light distribution includes a uniform light density that the surface profile compensator provides for at each pixel in an image sensor of the camera.

The systems or methods of any preceding clause wherein the target light distribution includes a uniform light distribution defined as an equivalent amount of illuminance being emitted onto subdivided regions of the inspection area and/or an equivalent amount of illuminance being received at the camera for each pixel or other subdivided regions of the images sensor.

The systems or methods of any preceding clause wherein equivalent light distribution is within a 5% of the target light distribution.

The systems or methods of any preceding clause wherein the target light distribution includes a non-uniform distribution of light based on one of surface conditions and geometric features of the part being inspected.

The systems or methods of any preceding clause where the light source includes a light emitting diode bank comprising a plurality of LEDS embed in a rectangular support, each of the plurality of LEDS controllable individually or in groupings to account for configurations of the part being inspected.

The systems or methods of any preceding clause where the plurality of LEDS are activatable in one or more multi-directional groupings to account for configurations of the part and likely locations of defects.

The systems or methods of any preceding clause where the plurality of LEDS are activatable cone-angle projection groups.

The systems or methods of any preceding clause where the cone-angle projection groups include circular or similar area grouping of the plurality of LEDs.

What is claimed is:

1. An inspection system comprising:
at least one light source that illuminates a contoured surface of a part being inspected; and
a surface profile compensator for the light source,
wherein the surface profile compensator causes light emitted from the at least one light source to be distributed over an inspection area of the contoured surface according to a target light distribution,
wherein the surface profile compensator comprises a support structure to which the light source is coupled, wherein the support structure is physically configured to complement contours of the contoured surface to distribute the light over the inspection area according to the target light distribution,
wherein the support structure includes a first support, a second support, and a bridge, wherein the bridge includes the light source and an optical path slot for a camera to view the inspection area through the support structure, is pivotably coupled to the first support, and is removably coupled to the second support to span over the inspection area.

2. The inspection system of claim 1 further comprising a controller electrically coupled to the light source,
wherein the controller acts as the surface profile compensator by adjusting an intensity of the light source at different locations to distribute the light over the inspection area according to the target light distribution.

3. The inspection system of claim 2 wherein the controller receives user input identifying a shape of the contoured surface and that, responsive to the user input, adjusts the intensity of the light source at the different locations based on the user input.

4. The inspection system of claim 2 further comprising a camera that captures images of the contoured surface, wherein the controller receives the images, parses the images to identify regions of the inspection area where the light is distributed contrary to the target light distribution, and adjusts the intensity of the light source at the different locations to correct light distribution in the identified regions to conform to the target light distribution.

5. The inspection system of claim 1 further comprising one or more actuators that actively deform the support structure to complement the contours of the contoured surface.

6. An inspection system comprising:
at least one light source that illuminates a contoured surface of a part being inspected; and
a surface profile compensator for the light source,
wherein the surface profile compensator causes light emitted from the at least one light source to be distributed over an inspection area of the contoured surface according to a target light distribution,
wherein the surface profile compensator comprises a support structure to which the light source is coupled, wherein the support structure is physically configured to complement contours of the contoured surface to distribute the light over the inspection area according to the target light distribution,
further comprising one or more actuators that actively deform the support structure to complement the contours of the contoured surface, and
further comprising one or more distance sensors associated with each of the one or more actuators, wherein each of the one or more distance sensors measure a respective current distance to the contoured surface, and wherein a controller directs each of the one or more actuators to deform the support structure such that the respective current distance as measured by each of the one or more distance sensors are within a predetermined range of each other.

7. An inspection system comprising:
at least one light source that illuminates a contoured surface of a part being inspected; and
a surface profile compensator for the light source,
wherein the surface profile compensator causes light emitted from the at least one light source to be distributed over an inspection area of the contoured surface according to a target light distribution,
wherein the surface profile compensator comprises a support structure to which the light source is coupled, wherein the support structure is physically configured to complement contours of the contoured surface to distribute the light over the inspection area according to the target light distribution, further comprising one or more actuators that actively deform the support structure to complement the contours of the contoured surface, and further comprising a controller that receives user input identifying a shape of the contoured surface and that, responsive to the user input, directs the one or more actuators to deform the support structure to complement the shape of the contoured surface based on the user input.

8. An inspection system comprising:
at least one light source that illuminates a contoured surface of a part being inspected;
a surface profile compensator for the light source,
wherein the surface profile compensator causes light emitted from the at least one light source to be distributed over an inspection area of the contoured surface according to a target light distribution,
wherein the surface profile compensator comprises a support structure to which the light source is coupled, wherein the support structure is physically configured to complement contours of the contoured surface to distribute the light over the inspection area according to the target light distribution,
further comprising one or more actuators that actively deform the support structure to complement the contours of the contoured surface, further comprising:
a camera that captures images of the contoured surface; and
a processor that receives the images, parses the images to identify regions of the inspection area where the light is distributed contrary to the target light distribution, and directs ones of the one or more actuators associated with the regions to deform the support structure to correct light distribution in the identified regions to conform to the target light distribution.

9. An inspection system comprising:
at least one light source that illuminates a contoured surface of a part being inspected; and
a surface profile compensator for the light source,
wherein the surface profile compensator causes light emitted from the at least one light source to be distributed over an inspection area of the contoured surface according to a target light distribution,
wherein the surface profile compensator comprises a support structure to which the light source is coupled, wherein the support structure is physically configured to complement contours of the contoured surface to distribute the light over the inspection area according to the target light distribution,
wherein the support structure is formed from a pliable material that conforms in part to a shape of the contoured surface when the support structure contacts the contoured surface.

10. An inspection system comprising:
at least one light source that illuminates a contoured surface of a part being inspected; and
a surface profile compensator for the light source,
wherein the surface profile compensator causes light emitted from the at least one light source to be distributed over an inspection area of the contoured surface according to a target light distribution,
further comprising a controller electrically coupled to the light source,
wherein the controller acts as the surface profile compensator by adjusting an intensity of the light source at different locations to distribute the light over the inspection area according to the target light distribution,
further comprising one or more distance sensors associated with different lighting elements of the light source, wherein each of the one or more distance sensors measures a respective current distance to the contoured surface, and wherein the controller adjusts the intensity of the light source by modifying respective light output from the different lighting elements based on the respective current distance as measured by each of the one or more distance sensors.

11. A method of illuminating an inspection area of a part being inspected, the method comprising:
determining a contoured shape of the inspection area; and
adjusting, via a surface profile compensator, light emitted from a light source to be distributed over the inspection area based on the contoured shape and a target light distribution,
wherein the surface profile compensator includes a support structure for the light source that physically deforms to complement the contoured shape of the inspection area,
wherein the support structure includes a first support, a second support, and a bridge, wherein the bridge includes the light source and an optical path slot for a camera to view the inspection area through the support structure, is pivotably coupled to the first support, and is removably coupled to the second support to span over the inspection area.

12. The method of claim 11 wherein the surface profile compensator includes a controller that alters an amount of light output by different lighting elements of the light source at different locations to distribute the light over the inspection area based on the determination of the contoured shape.

13. The method of claim 12, wherein the controller receives user input identifying the contoured shape and that, responsive to the user input, adjusts an intensity of the light source at the different locations based on the user input.

14. The method of claim 11 further comprising one or more actuators that actively deform the support structure to complement the contoured shape of the inspection area.

15. A method of illuminating an inspection area of a part being inspected, the method comprising:
determining a contoured shape of the inspection area; and
adjusting, via a surface profile compensator, light emitted from a light source to be distributed over the inspection area based on the contoured shape and a target light distribution,
wherein the surface profile compensator includes a controller that alters an amount of light output by different lighting elements of the light source at different locations to distribute the light over the inspection area based on the determination of the contoured shape,
wherein the controller adjusts an intensity of the light source by modifying respective light output from the different lighting elements based on a respective current distance of each of the different lighting elements to the inspection area as measured by each of one or more distance sensors respectively associated with each of the different lighting element.

16. A method of illuminating an inspection area of a part being inspected, the method comprising:
determining a contoured shape of the inspection area; and adjusting, via a surface profile compensator, light emitted from a light source to be distributed over the inspection area based on the contoured shape and a target light distribution,
wherein the surface profile compensator includes a support structure for the light source that physically deforms to complement the contoured shape of the inspection area, further comprising one or more actuators that actively deform the support structure to complement the contoured shape of the inspection area,
further comprising one or more distance sensors associated with each of the one or more actuators, wherein each of the one or more distance sensors measure a respective current distance to the inspection area, and wherein a controller directs each of the one or more actuators to deform the support structure such that the respective current distance as measured by each of the one or more distance sensors are within a predetermined range of each other.

\* \* \* \* \*